Figure 1:
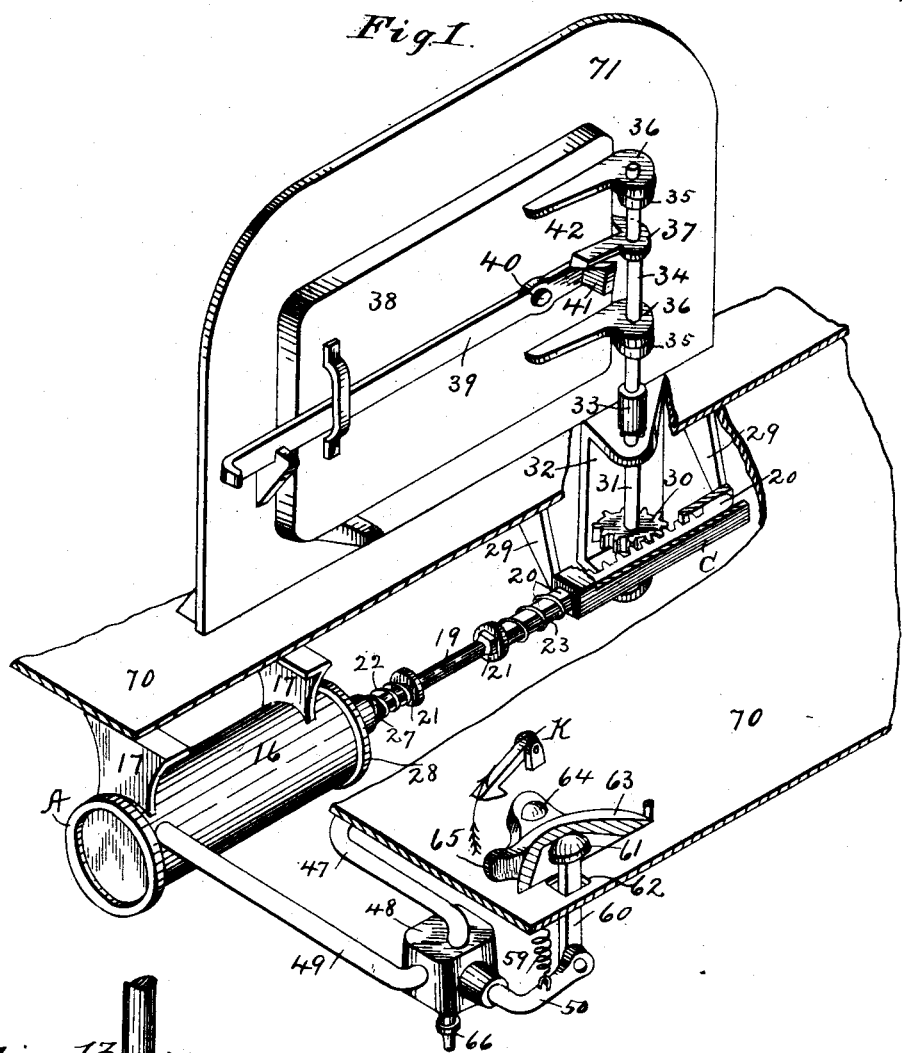

No. 680,989. Patented Aug. 20, 1901.
H. H. THOELE & C. W. H. MOELLER.
DEVICE FOR OPENING OR CLOSING FURNACE DOORS.
(Application filed June 25, 1900.)

(No Model.) 3 Sheets—Sheet 1.

Inventors
Henry H. Thoele
Charles W. H. Moeller
by W. Rees Edelen
their atty.

No. 680,989. Patented Aug. 20, 1901.
H. H. THOELE & C. W. H. MOELLER.
DEVICE FOR OPENING OR CLOSING FURNACE DOORS.
(Application filed June 25, 1900.)
(No Model.) 3 Sheets—Sheet 2.
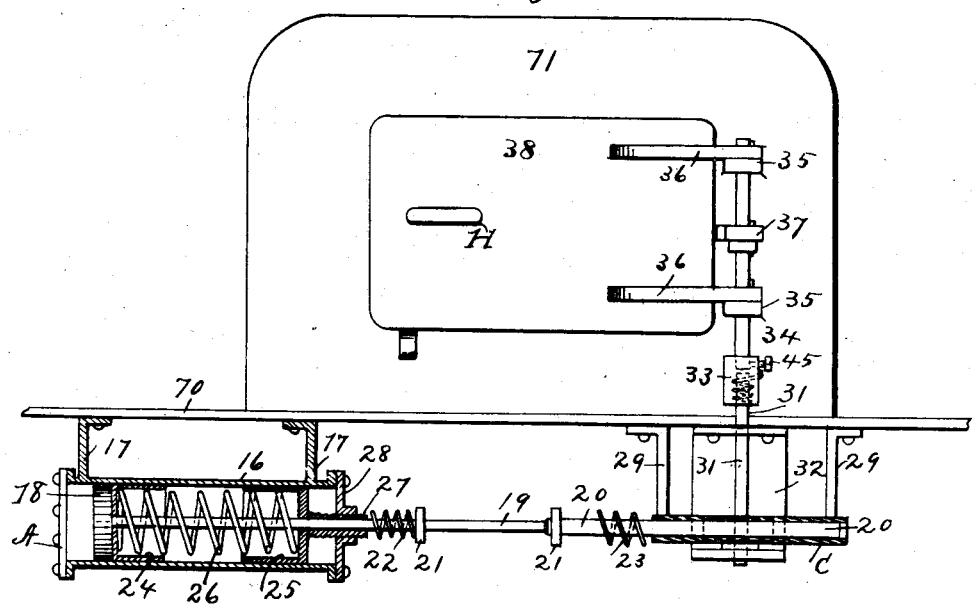
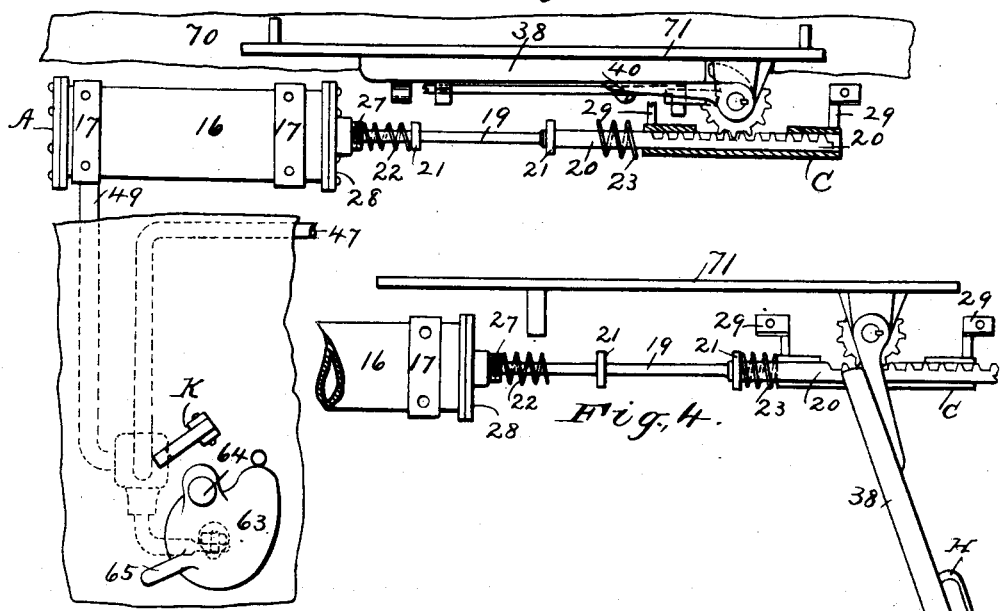
Witnesses
Inventors
Henry H. Thoele
Charles W. H. Moeller
by W. Rees Edelen
their Atty No. 680,989. Patented Aug. 20, 1901.
H. H. THOELE & C. W. H. MOELLER.
DEVICE FOR OPENING OR CLOSING FURNACE DOORS.
(Application filed June 25, 1900.)
(No Model.) 3 Sheets—Sheet 3.
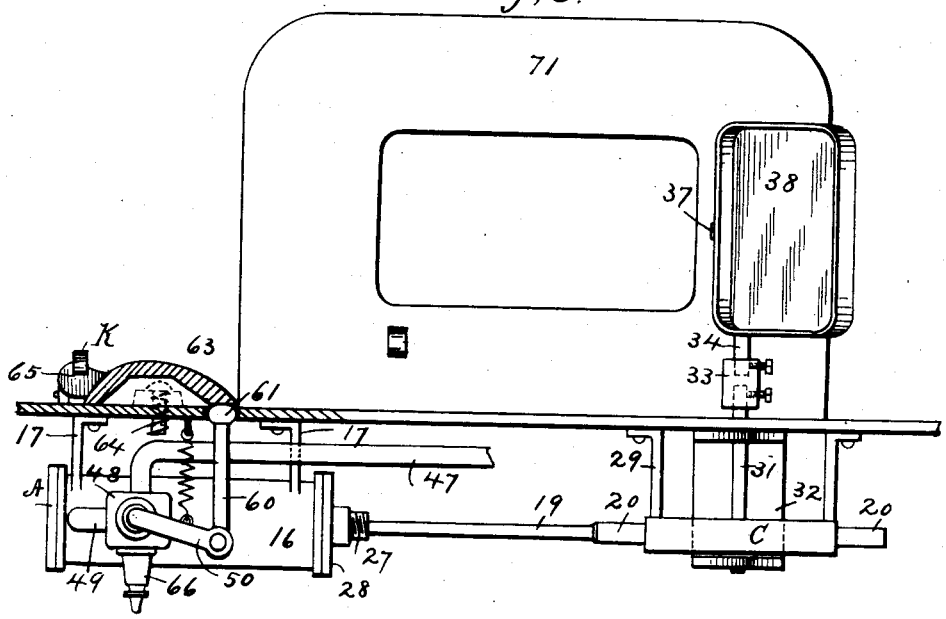
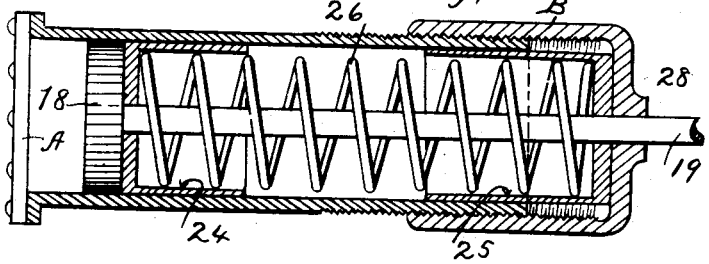
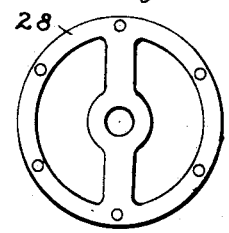
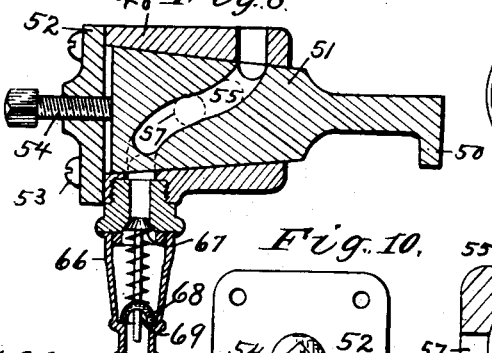
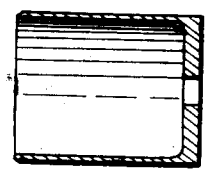
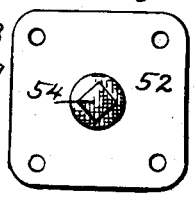
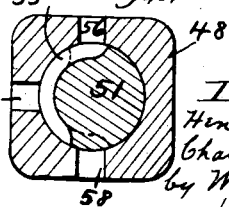

UNITED STATES PATENT OFFICE.

HENRY H. THOELE AND CHARLES W. H. MOELLER, OF FLORENCE, ALABAMA.

DEVICE FOR OPENING OR CLOSING FURNACE-DOORS.

SPECIFICATION forming part of Letters Patent No. 680,989, dated August 20, 1901.

Application filed June 25, 1900. Serial No. 21,543. (No model.)

*To all whom it may concern:*

Be it known that we, HENRY H. THOELE and CHARLES W. H. MOELLER, citizens of the United States, residing at Florence, in the county of Lauderdale and State of Alabama, have invented certain new and useful Improvements in Devices for Opening or Closing Furnace-Doors; and we do hereby declare the following to be a full, clear, and exact description of the invention, such as will enable others skilled in the art to which it appertains to make and use the same.

Our invention has reference to improvements in devices for opening and closing furnace-doors, and which consists of certain novel features of construction, which will be hereinafter fully described in the specification, elucidated in the drawings, and clearly pointed out in the claims.

The object of the present invention is to produce a practical device for opening and closing furnace-doors without the operator or fireman manipulating the same. Many devices have been invented for producing the desired results; but the serious objection lies in the location of the machinery, which was attached to the front of the boiler above the furnace-door, thus monopolizing the space which is designed for other purposes in an engine-cab. Other objections to this class of devices lie in their complicated mechanism, which is liable to get out of order.

The present device is an improvement over our patent of February 20, 1900, No. 643,697, as regards simplicity of operation and the number of parts employed.

The present invention is located under the floor of the engine and entirely out of sight of the engineer. The only observable feature of the device is the push-bar and its accompanying cover or cam, the latter for protecting the push-bar and the former for operating the devices by the foot of the fireman for manipulating the furnace-door.

The salient features of the invention lie in the cylinder and the door-pintle. The former is operated at one end for closing the door by means of an adjustable spring. The opposite end of said cylinder is operated by any of the gases, such as steam or air, through the medium of a single pipe and operating-valve. The latter device consists of two parts—viz., the door-pintle, which terminates in a coupling, and a vertical shaft secured to the operating-gear and which also terminates in said coupling. This coupling contains a spring and is so connected in relation to the vertical shaft and the coupling that the furnace-door can be closed by the operating mechanism, or it can be closed or opened independently of said mechanism at the will of the fireman.

Our invention further consists in having cups or thimbles in the cylinder for holding the spring in place and preventing said spring from contacting the inside of the cylinder, and thus preventing undue wear. The forward thimble is adjustable in the skeleton cylinder-head. By this means the tension of the spring can be varied at will.

Our invention further consists in providing an operating-valve with a single groove in the plug and adapted to open and close three ports at stated intervals.

It also consists of a small drip-valve at the exhaust-port to prevent leaking of the operating-valve.

It also further consists in reversing the operating-valve—*i. e.*, have the large end of the plug where the small end is usually put for the purpose of employing an adjusting-screw to tighten up the plug from wear or other causes.

Our invention further consists in providing a latchless door and a spring in the coupling for holding the door closed in conjunction with the adjustable spring in the operating-cylinder.

Our invention further consists in providing buffer-springs on the piston-rod of the cylinder and also the rack-bar.

Figure 13:
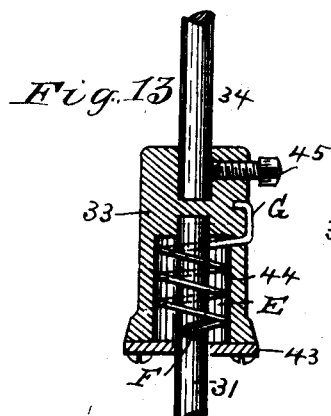
Figure 14:
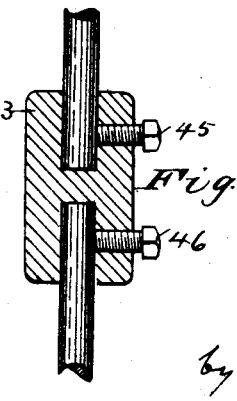
Figure 15:
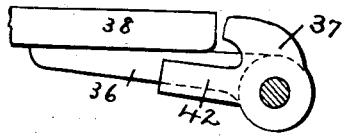

In the drawings, Figure 1 represents in perspective view our improved device for operating furnace-doors. Fig. 2 is a front elevation of the device with some of the parts in section. Fig. 3 is a plan of the device, partly in section, with the door closed. Fig. 4 is also a plan view of the device, partly broken away, with the door open. Fig. 5 is a front elevation of the device complete with the door open. Fig. 6 is a detail in section of the cylinder and its adjustable spring on a large scale. Fig. 7 is a front elevation of the skeleton cylinder-head. Fig. 8 is a longitudinal section of the operating-valve and a vertical section of the drip-valve. Fig. 9 is a transverse section of the operating-valve through the ports. Fig. 10 is a front elevation of the operating-valve plate. Fig. 11 is an end view of one of the thimbles. Fig. 12 is a longitudinal section of one of the thimbles. Fig. 13 is a vertical section of the spring-coupling for automatically closing the furnace-door. Fig. 14 is a vertical section of a plain coupling. Fig. 15 is a detail of the furnace-door and the lug for closing the door.

The invention consists of a cylinder 16, and which may be operated by steam, compressed air, gas, or any of the fluids used for such purposes. The cylinder is provided with a solid head A and a skeleton head 28, and said cylinder is supported by hangers 17. Inclosed in said cylinder are two thimbles 24 and 25 for supporting a spring 26 and preventing undue wear of said spring, as the constant rubbing of the spring against the cylinder will make it thin in places, and consequently it will break much sooner than if it was protected by the aforesaid thimbles. The thimbles are held in place against the cylinder-head or the adjusting-screw by the spring 26. In Fig. 6 the skeleton head 28 is provided with a sleeve B, which is screw-threaded and engages a screw-threaded portion of the cylinder 16. This device adjusts the spring through the medium of the thimble 25. The other figures indicate a plug 27 for adjusting said thimble 25, both adjusting devices accomplishing the same result. The spring 16 is for closing the furnace-door. The door is opened by the steam or gases forcing against the piston 18. It takes but a small amount of power to operate the cylinder, as it is four by six inches and requires one-fourth of a horse-power to operate it, and it is operated so seldom that the amount of steam or air to run it is merely nominal. Secured on the piston-rod 19 and the rack-bar 20 are collars 21 for receiving the thrust of buffer-springs 22 and 23, respectively.

The rack 20, previously referred to, slides in a rectangular way or guide C, which engages a spur gear-wheel 30, the latter being secured to the vertical shaft 31. Said guide C is supported by hangers 29, secured to the floor of the engine.

The vertical shaft 31 is held in a coupling 33, which is provided with a cap 43. Said coupling has a chamber E therein for the reception of a spiral spring 44, which encircles said vertical shaft 31. One end of the spring is secured to the shaft at F, the other end being secured to the coupling at G. By this arrangement of the spring the entire thrust or rotation of the gear-wheel 30 through shaft 31 is transmitted to the spring 44, and consequently turns said coupling and also the pintle 34, which is secured in said coupling by a set-screw 45, and thus operating the furnace-door 38 through the medium of the lug 37, mounted on said pintle 34. In Fig. 14 a solid coupling is shown with two set-screws 45 and 46, respectively. The pintle 34 can readily be detached from the coupling in case of an accident to the mechanism for operating the furnace-door by releasing the set-screw 45, previously referred to.

The great utility of the spring-coupling is its adaptability for sudden emergencies. For instance, if the spring 26 becomes weakened before it can be observed by the engineer this spring 44 will keep the furnace-door tightly closed or from any other cause whereby the mechanism may become slightly impaired.

The chief and most important function of the spring-coupling 33 lies in its independent action from the steam-motor mechanism for opening the furnace-door, as the fireman can grasp the handle H and pull open the door against the resilience or torsion of said spring 44, while the other mechanism is stationary. This could not be accomplished if the pintle was connected direct to the gear-wheel 30 or to the coupling indicated in Fig. 14 unless the set 45 was slacked up, as previously referred to.

The furnace-door is mounted on ears 35, which are secured to the furnace-front 71. Pivotally secured at 40 to said door is a latch 39, which is operated in a similar manner as the device in my patent previously referred to through the medium of the arm 42, which forms part of the lug 37.

The operating-valve 48 is provided with a supply-port 56, which is connected to the feed-pipe 47. The port 57 is connected to the pipe 49, which leads to the cylinder 16, and the exhaust-port 58 communicates with a drip-valve 66. Valve 48 is provided with a plug 51, which has an operating-arm 50, connecting to a push-bar 60, the latter extending through a hole 62 in the floor 70 and terminating in a knob 61, the latter being acted upon when desiring to operate the furnace-door by means of the cam 63, which is pivoted at 64 to a spring-pin through the medium of a lug 65, operated by the fireman. When necessary to hold the furnace-door open for any length of time for cooling-off purposes or when the boiler is priming or for poking the fire, the lug 65, previously referred to, engages under the latch K, and consequently holds the door in the position shown in Fig. 5. The fireman becomes so accustomed to operating the cam that the latch K is not engaged whenever the door is opened, but is only engaged at the will of the fireman and then by a slight extra push forward. When necessary to disengage said latch K, the fireman elevates the latch with the toe of his shoe, when the cam returns to its normal position through the action of the spring coiled on the pivotal connection 64. (See Fig. 5, also Fig. 1, which clearly indicates the aforesaid spring.) The valve-plug 51 is provided with an elongated passage or groove 55, which communicates with the supply-port 56 and the cylinder-port 57. By a slight turn of the plug 51 the cylinder-port 57 and the exhaust-port 58 will engage said groove 55, as indicated in dotted lines in Figs. 8 and 9, respectively. The exhaust passing from the port 58 forces the spring-valve 67 down and allows said exhaust to escape through the opening 69 in the cup 68. When the furnace-door is closed through the medium of the springs 26 and 44, all the exhaust-steam has escaped from the cylinder 16 through the leak-valve 66, and to prevent any live steam or compressed air from escaping through the operating-valve the leak-valve is provided with a spring, as the spring connected to said valve 66 is of sufficient strength to hold the accumulated leakage from the supply-valve 48 until the valve is operated to open the furnace-door. The spring referred to will readily yield to the exhaust from the cylinder 16.

The operating or supply valve 48 is provided with an adjusting device, which consists of a plate 52, secured to the valve by bolts 53, and a set-screw 54, which contacts the plug 51 to hold said plug in place and prevent it from leaking.

The springs 22 and 23, previously referred to, rest loosely on their supports and are only compressed near the termination of the stroke of the piston-rod and the rack-bar, thus checking somewhat the accumulated energy of the spring 26 and the steam-piston 18, but at the same time allowing the aforesaid spring and piston to complete their work.

When operating our improved device, the fireman operates the cam 63 by means of his foot pushing against the lug 65, when the inclined cam-surface forces downward the push-bar 60, and the valve 48 is operated through the medium of the lever or arm 50, thus opening the ports 56 and 57 for supplying steam to the cylinder 16, and as the steam enters said cylinder the piston is forced forward, which operates the rack-bar C, and said rack-bar in turn operates the gear-wheel 30, which rotates the vertical shaft 31 and the pintle 34 through the medium of the coupling 33, and as said pintle is actuated it turns the lug 37, which contacts the rear portion of the door 38 and opens the same, as indicated in the various figures of the drawings. As soon as the fireman takes his foot off the cam-lug 65 the spring 59 returns the valve to its normal position, and the springs 26 and 44 close the door securely, whether latchless or otherwise.

We claim—

1. In mechanism for opening and closing furnace-doors, comprising a hinged door, a pintle passing through and secured to the hinges of said door, a lug on said pintle for contacting with the door, a spring-coupling, the pintle being adjustably secured in one end of said coupling, a vertical shaft secured in the other end of said coupling, and a motor for actuating said shaft, substantially as described.

2. In mechanism for opening and closing furnace-doors, comprising a hinged door, a pintle secured to the hinges of said door, a spring-coupling, the pintle being secured to one end of the coupling, a shaft secured to the other end of the coupling, a gear-wheel on said shaft, a rack-bar engaging said gear-wheel, and a motor for operating said rack-bar, substantially as described.

3. In mechanism for opening and closing furnace-doors, comprising a hinged door, a pintle secured to the hinges of said door, a spring-coupling, the pintle being secured to the coupling, a shaft also secured to the coupling, a gear-wheel on said shaft, a rack-bar engaging said gear-wheel, a cylinder, a piston, a piston-rod connected to the rack-bar and an adjustable spring within said cylinder surrounding the piston-rod, substantially as described.

4. In mechanism for opening and closing furnace-doors, comprising a hinged door, a pintle secured to the hinges of said door, a lug on said pintle for contacting with the furnace-door, a spring-coupling, the pintle being secured to the coupling, a shaft also secured to the coupling, a gear-wheel on said shaft, a rack-bar engaging said gear-wheel, a cylinder, a piston, a piston-rod connecting to the rack-bar, and an adjustable spring within said cylinder surrounding the piston-rod as described and shown.

5. In mechanism for opening and closing furnace-doors, comprising a hinged door, a pintle secured to the door-hinges, a cylinder, a piston, a piston-rod for operating the pintle, a spring within the cylinder, thimbles for supporting said spring, means for adjusting one of said thimbles, and means for admitting a motor fluid to said cylinder, substantially as described.

6. In mechanism for opening and closing furnace-doors, comprising a hinged door, a pintle secured to the door-hinges, a cylinder, one skeleton or open head on said cylinder, a piston, a piston-rod for operating the pintle, a spring within the cylinder, thimbles for supporting said spring, means for adjusting one of said thimbles, and means for admitting a motor fluid to said cylinder substantially as described.

7. In mechanism for opening and closing furnace-doors, comprising a hinged door, a pintle secured to the hinges of said door, a spring-coupling, the pintle being secured to the coupling, a shaft also secured to the coupling, a gear-wheel on said shaft, a rack-bar engaging said gear-wheel, a cylinder, an operating-valve consisting of three ports, a plug within said valve having an elongated passage or groove connecting with said cylinder, a piston, a piston-rod connected to the rack-bar and an adjustable spring within said cylinder surrounding the piston-rod, as shown and described.

8. In mechanism for opening and closing furnace-doors, comprising a hinged door, a pintle secured to the hinges of said door, a lug on said pintle for contacting with the furnace-door, a coupling, the pintle secured to the coupling, a shaft also secured to the coupling, a gear-wheel on said shaft, a rack for engaging said gear-wheel, a cylinder, an operating-valve, a plug within said valve, an adjusting-screw for taking up the wear of said plug in said valve, a piston, a piston-rod connecting to the rack-bar for the purpose, substantially as shown and described.

In testimony whereof we affix our signatures in presence of two witnesses.

HENRY H. THOELE.
CHARLES W. H. MOELLER.

Witnesses:
E. T. RICE,
J. E. HENLEY.